United States Patent
Kismarton

(10) Patent No.: US 11,969,953 B2
(45) Date of Patent: Apr. 30, 2024

(54) PREPREG CHARGE OPTIMIZED FOR FORMING CONTOURED COMPOSITE LAMINATE STRUCTURES

(71) Applicant: The Boeing Company, Chicago, IL (US)

(72) Inventor: Max U. Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/814,996

(22) Filed: Jul. 26, 2022

(65) Prior Publication Data

US 2024/0034005 A1    Feb. 1, 2024

(51) Int. Cl.
| | | |
|---|---|---|
| *B29C 70/20* | (2006.01) | |
| *B29B 11/16* | (2006.01) | |
| *B29L 31/30* | (2006.01) | |

(52) U.S. Cl.
CPC ............ *B29C 70/202* (2013.01); *B29B 11/16* (2013.01); *B29L 2031/3076* (2013.01)

(58) Field of Classification Search
CPC ................... B29C 70/202; B29B 11/16; B29L 2031/3076
See application file for complete search history.

(56) References Cited

U.S. PATENT DOCUMENTS

| | | |
|---|---|---|
| 8,354,156 B2 | 1/2013 | Taketa et al. |
| 8,906,494 B2 | 12/2014 | Wadahara et al. |
| 10,604,633 B2 | 3/2020 | Ogasawara et al. |
| 10,808,091 B2 | 10/2020 | Taketa et al. |
| 10,960,615 B2 | 3/2021 | Shaw et al. |
| 10,994,502 B2 | 5/2021 | Modin et al. |
| 2009/0166467 A1 | 7/2009 | Hagman et al. |
| 2010/0028593 A1* | 2/2010 | Taketa ............. B32B 5/26 428/113 |
| 2010/0233424 A1* | 9/2010 | Dan-Jumbo ........ B32B 27/38 428/113 |
| 2013/0095282 A1* | 4/2013 | Taketa ............. B32B 3/266 428/113 |
| 2017/0368815 A1* | 12/2017 | Blom-Schieber ..... B32B 5/26 |
| 2019/0275753 A1* | 9/2019 | Kendall ............ B29C 70/34 |
| 2020/0139649 A1 | 5/2020 | Modin et al. |

OTHER PUBLICATIONS

Kismarton, Method and Apparatus for High Rate Production of Composite Laminate Structures, U.S. Appl. No. 17/814,992, filed Jul. 26, 2022, 56 pages.
European Patent Office Extended Search Report, dated Dec. 5, 2023, regarding Application No. EP23172430.3, 6 pages.
1 Office Action dated Dec. 21, 2023, regarding U.S. Appl. No. 17/814,992, 20 pages.

* cited by examiner

*Primary Examiner* — Brian Handville
(74) *Attorney, Agent, or Firm* — Yee & Associates, P.C.

(57) ABSTRACT

A composite charge used to compression form a stringer comprises multiple plies of unidirectional, prepreg having various fiber orientations. Certain of the plies have a pattern of angled cuts allowing the plies to stretch both longitudinally and transversely during forming, thereby reducing ply wrinkling in contoured areas of the stringer.

20 Claims, 13 Drawing Sheets

PREPREG CHARGE OPTIMIZED FOR FORMING CONTOURED COMPOSITE LAMINATE STRUCTURES

BACKGROUND INFORMATION

1. Field

The present disclosure generally relates to processes and materials used to form composite structures, and deals more particularly with a prepreg charge optimized for forming contoured composite laminate stringers.

2. Background

Composite laminate stiffeners are used throughout the aircraft, marine and other industries. For example, composite laminate stringers having any of various cross sectional shapes are used in the fuselage and wings of airplanes. The stringers normally have one or more contours or other out-of-plane features along their lengths for various reasons.

Several techniques can be used to produce composite laminate stringers, such as hand layup and automated fiber placement, each of which build stringer layups ply-by-ply. However, these techniques are both costly and relatively slow, and therefore not well-suited high volume production. Another technique for producing stringers consists of compression forming a flat stack of composite plies, sometime referred to as a charge, between a pair of dies matching the desired stringer shape. This technique, sometimes referred to as "punch forming", is problematic when producing contoured stringers because of the tendency of the plies in contoured areas to wrinkle or buckle during the forming process. Ply wrinkling may have an undesirable effect on stringer performance.

Accordingly, there is a need for a method of producing contoured composite laminate stringers that reduces or eliminates ply wrinkling. There is also a need for a related composite charge that is optimized to be formed into various types of stringer shapes without ply wrinkling during the forming process.

SUMMARY

The disclosure relates in general to methods and materials for producing composite structures, and more specifically with a method and a highly formable charge for making contoured composite laminate stringers.

According to one aspect, a method is provided of making a composite charge used to form a contoured composite laminate structure. The method includes selecting a schedule of plies, each of which has fibers, including selecting angles for the fibers in each of the plies in the schedule of plies. The method also includes selecting, for each of the plies in the schedule of plies, a length of the fibers in the plies based on an amount to which the ply must stretch during forming of the composite charge to contours. The method further includes making cuts in the fibers in at least certain of the plies to a length.

According to another aspect, a composite charge is provided that is used to form a contoured stringer. The charge includes a stack of prepreg plies each having unidirectional reinforcement fibers held in a polymer matrix. The stack includes 0° plies having 0° fibers, 45° plies having 45° fibers, and 90° plies having 90° fibers. The 0° plies have a pattern of angled cuts therein forming 0° fibers having a length of between approximately 10 inches and approximately 20 inches. The 45° plies have a pattern of angled cuts therein forming 45° fibers having a length between approximately 2 inches and approximately 4 inches.

According to further aspect, a composite charge is provided that is used to form a contoured airplane stringer. The charge comprises a stack of prepreg plies, each having unidirectional reinforcement fibers held in a polymer matrix. The stack includes 0° plies having 0° fibers, 45° plies having 45° fibers, and 90° plies having 90° fibers. The 0° plies have angled cuts therein separating the 0° fibers into lengths allowing the 0° plies to stretch longitudinally during forming of the charge to a desired contour. The 45° plies have angled cuts therein separating the 45° fibers into lengths allowing the 45° plies to stretch transversely during forming of the charge into the shape of the stringer.

According to another aspect, a method is provided of making a composite charge used to form a contoured composite laminate stringer. The method comprises laying up a stack of prepreg plies containing unidirectional reinforcement fibers. The layup process includes laying up a plurality of 0° plies each having 0° reinforcing fibers that are cut at an angle of approximately 15° to form 0° fiber lengths from approximately 10 inches to approximately 30 inches. The layup process also includes laying up a plurality of 45° plies each having 45° reinforcing fibers that are cut at an angle of approximately 15° to form 45° fiber lengths from approximately 2 inches to approximately 4 inches.

According to still a further aspect, a method is provided of making a composite charge used to form a contoured composite laminate stringer. The method includes forming angled cuts in each of a plurality of plies of prepreg allowing the plies to stretch as the composite charge is formed into a contoured composite laminate stringer. The method also includes forming charge segments by laying up a plurality of stacks of the plies, and assembling the composite charge by joining the charge segments together end-to-end.

One of the advantages of the disclosed method and composite layup is that composite laminate stringers having one or more contours can be formed to a desired stringer shape in which ply wrinkling is reduced or eliminated. A further advantage is that a multi-ply composite charge can be produced that is highly formable with little or no strength knockdown. Another advantage is that contoured composite laminate stringers can be produced easily and relatively quickly, making the stringer production process well-suited for high-volume production environments. A further advantage is that substantially wrinkle-free contoured composite laminate stringers can be economically produced using relatively low-cost production equipment. Still another advantage is that stringer scrap and labor required to rework stringers is reduced.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

DETAILED DESCRIPTION

Figure 1:
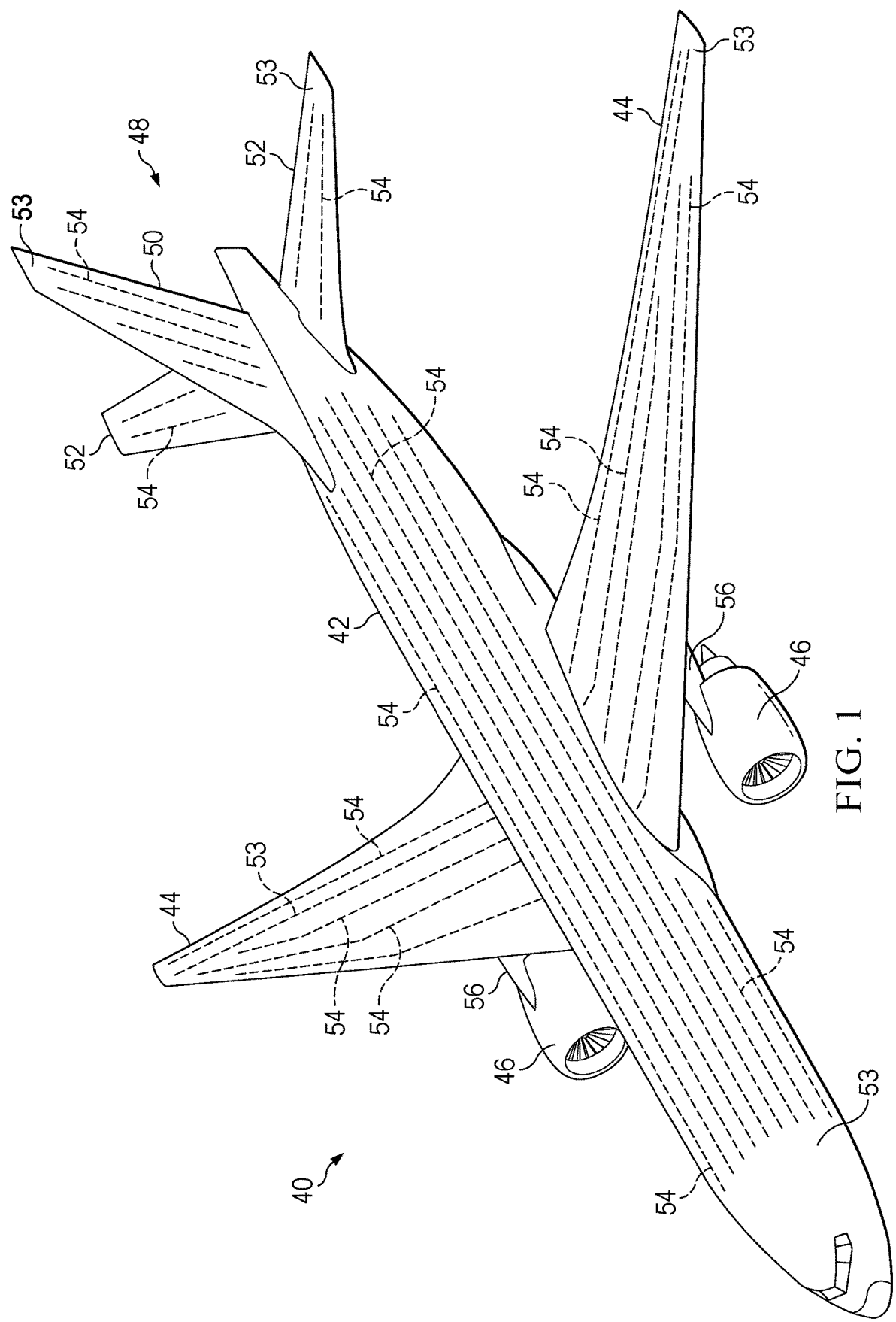
FIG. 1 is an illustration of a perspective view of an airplane in which the location of stringers is indicated by broken lines.

Referring first to FIG. 1, an airplane 40 includes a fuselage 42, wings 44 and an empennage 48 comprising a vertical stabilizer 50 and horizontal stabilizers 52. Engines 46 are suspended from the wings 44 by pylons 56. Each of these airframe components 42, 44, 50, 52 includes a skin 53 that is reinforced and stabilized by stiffeners such as stringers 54, comprising a composite laminate such as a carbon fiber reinforced polymer (CFRP). Each of the stringers 54 may have any of a variety of cross sectional shapes, such as, without limitation, I, J, Y, Z, and hat shapes. The stringers 54 are joined to the IML (inner mold line) of the skin 53, typically by co-curing or by co-bonding.

Figure 2:
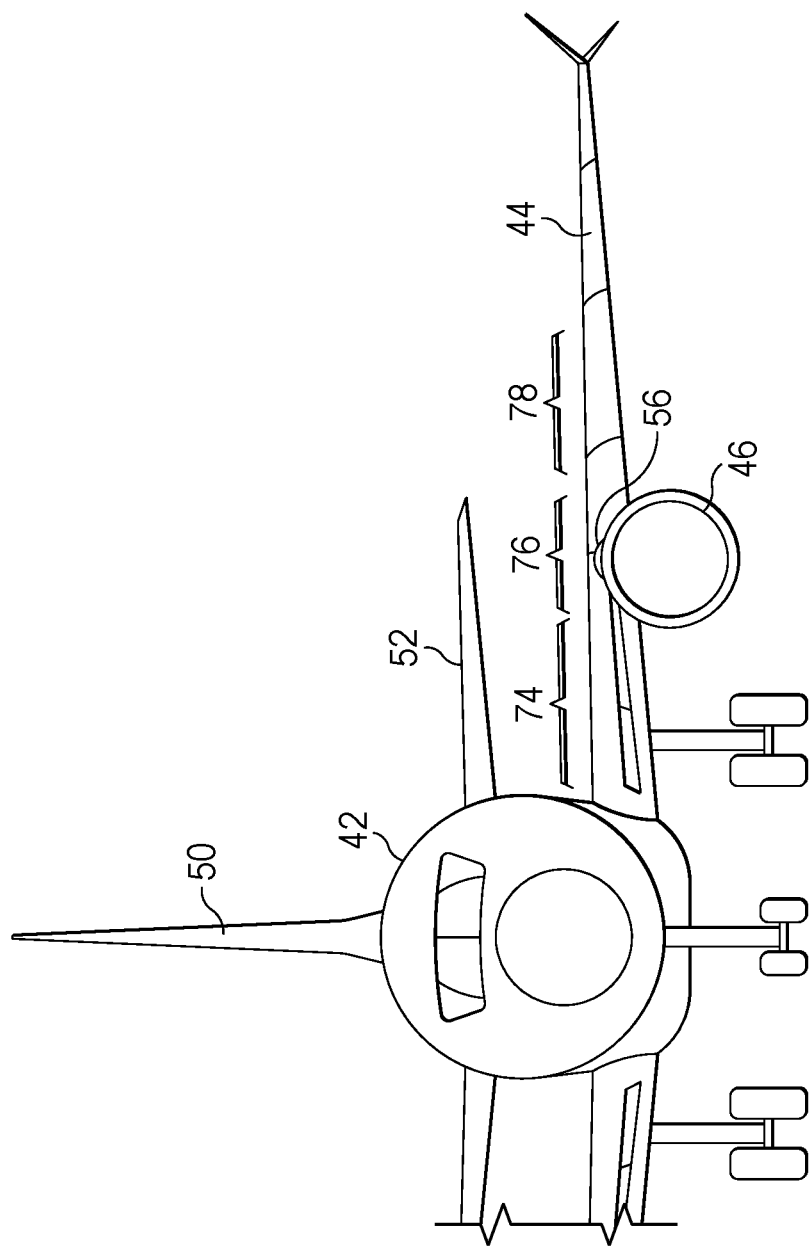
FIG. 2 is an illustration of a fragmentary, front elevational view of the airplane shown in FIG. 1.

The nature of the loads carried by the stringers 54 is different than those carried by the skin 53 and other components such floor beams and control surfaces (both not shown), making stringers 54 unique in their design and production. The design and production of stringers 54 used in airplanes can be particularly challenging because they are seldom straight, but rather comprise differing sections that are contoured and tailored to suit local load conditions and/or structural geometries. For example, referring to FIG. 2, an inboard section 74 of a wing 44 possesses contours that requires the stringers 54 in this section to be similarly contoured. As used herein, "contour" and "contoured" includes curves, curvatures and out of plane features or sections, including but not limited to ramps, pad-ups, contours and/or joggles. An intermediate section 76 of the wing 44 that supports the weight of a pylon 56 and engine 46 may require ramps, pad ups or other out-of-plane features in the stringers 54 in order to carry added loads. An outboard section 78 of the wing 44 may include internal components (not shown) that require that the stringers 54 in this section have joggles or unique features. The loads that a stringer 54 may be required to react in the inboard section 74, the intermediate section 76, and the outboard section 78 of the wing 44 can be quite different, consequently it is often necessary to tailor the stringer 54 to meet local conditions along its length.

Figure 3:
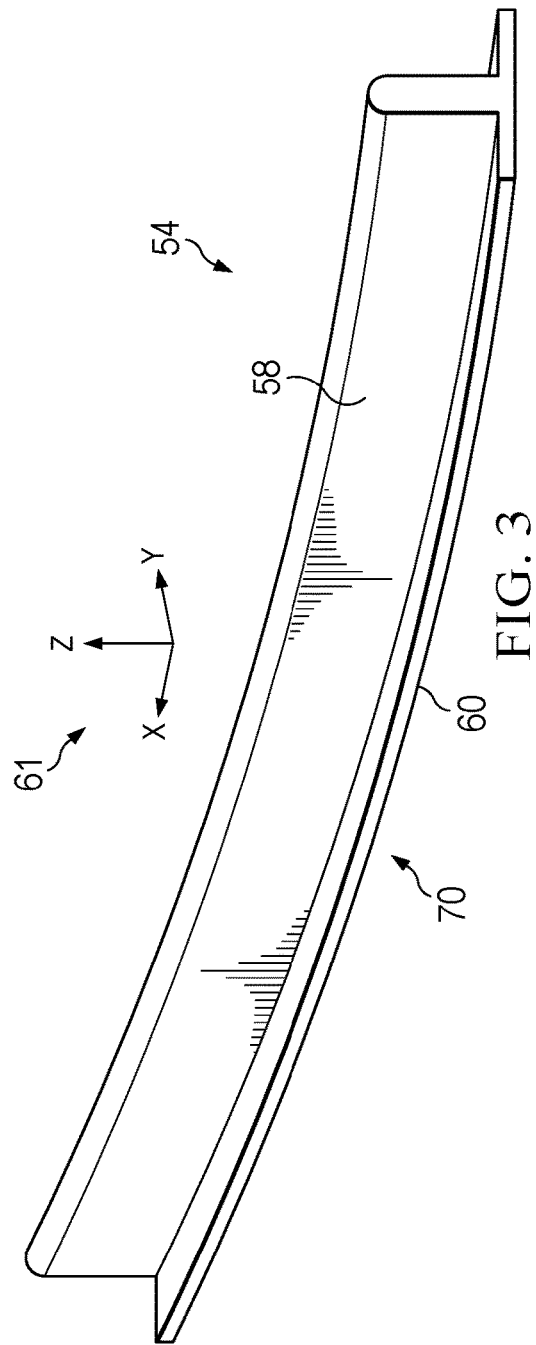
FIG. 3 is an illustration of a perspective view of a curved blade stringer.
Figure 4:
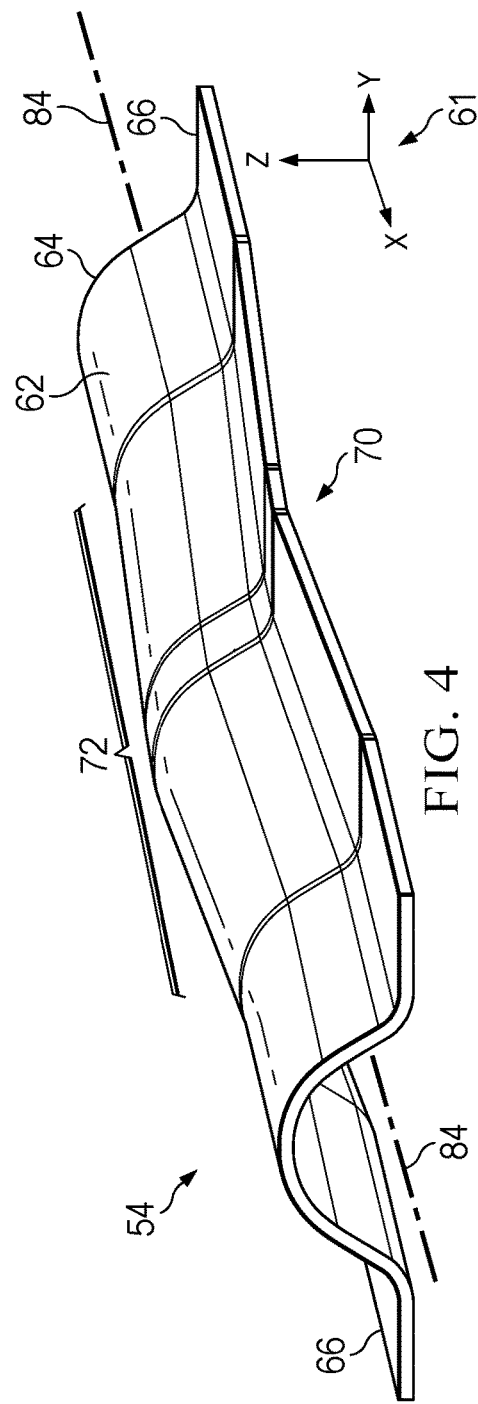
FIG. 4 is an illustration of a perspective view of a hat stringer having a ramp section.
Figure 5:
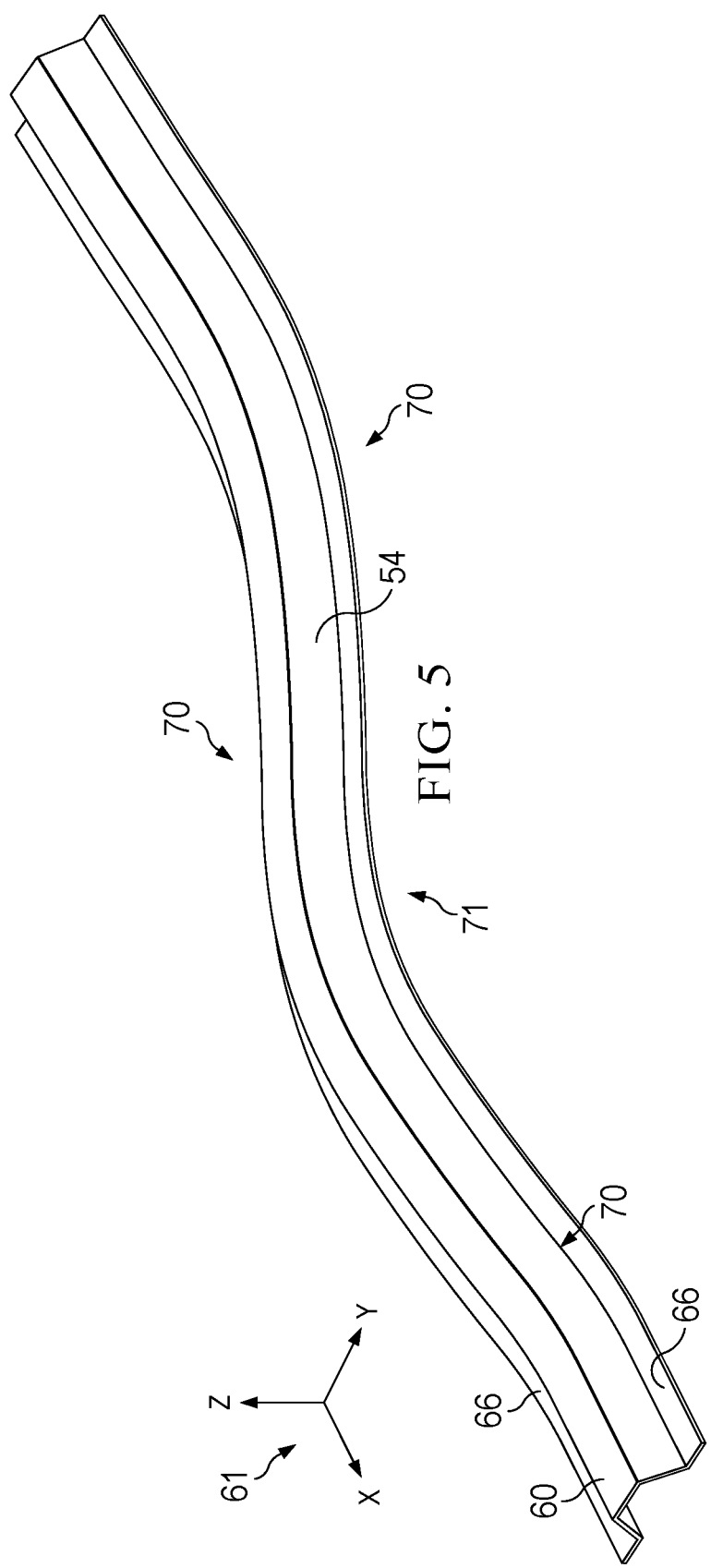
FIG. 5 is an illustration of a perspective view of a hat stringer having both ramp and joggle sections.

As indicated above, a stringer 54 may have any of a variety of contours and/or other out-of-plane features at differing sections along its length. FIGS. 3-5 illustrate several stringers 54 having typical out-of-plane features. For example, referring to FIG. 3, a stringer 54 having a blade such as that used in the wings 44 of the airplane 40 shown in FIG. 1 comprises a blade 58, sometimes referred to as a web, and a flange or cap 60 that is configured to match contours of the skin 53 to which the cap 60 is to be attached. In this example, the stringer 54 has a contour 70 along its entire length in the XZ plane within coordinate system shown at 61, however in other examples the stringer 54 may have straight sections as well as other local contours or out-of-plane features along its length.

FIG. 4 illustrates another example of a stringer 54, having a hat shape. The stringer 54 has a rounded top 62 connected to outwardly turned flanges 66 by webs 64. In this example, the stringer 54 has an out-of-plane feature in the form of a ramp 72. In other examples, the stringer 54 may have compound contours. For example, referring to FIG. 5, a stringer 54 has a contour 70 in the XZ plane and also has a contour 70 referred to as joggle, in the XY plane.

Figure 6:
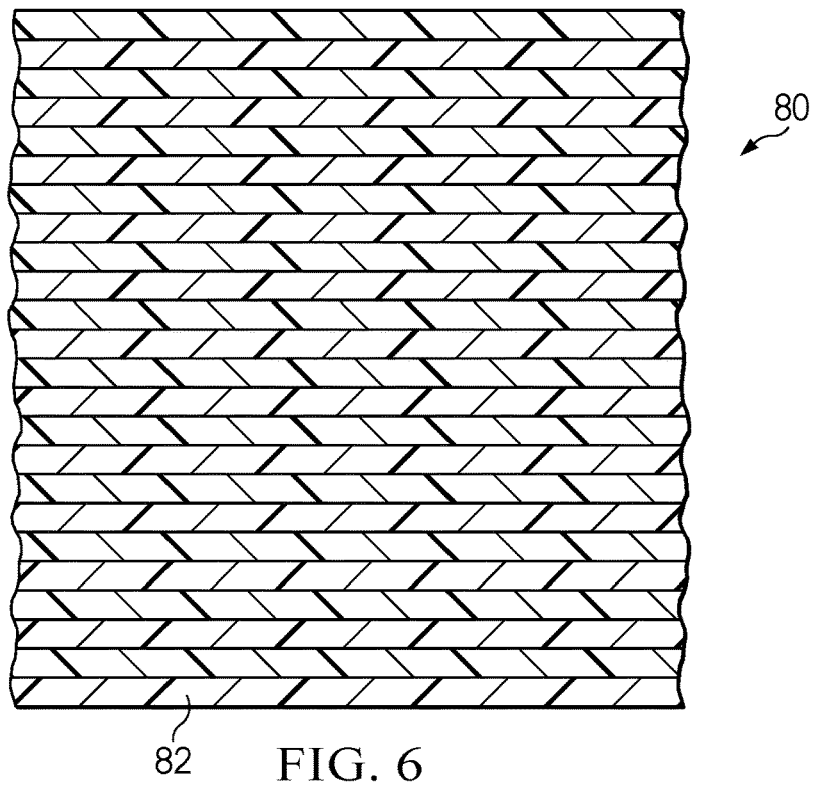
FIG. 6 is an illustration of a fragmentary, cross sectional view of a multi-ply, highly formable composite charge.

Referring now also to FIG. 6, stringers 54 having contours can be produced by forming a composite charge 80 comprising a stack 81 of plies 82 of prepreg to a desired stringer shape. Forming the composite charge 80 can be challenging because of the tendency of the plies 82 to wrinkle or buckle due to the contours. However, wrinkling and buckling during the forming process can be reduced or eliminated by optimizing the plies 82 of the composite charge 80 in the manner described below. Furthermore, the plies 82 can be tailored along the length of the composite charge 80 to meet local load demands and other requirements of the particular application. While the present disclosure illustrates the use of the composite charge 80 to produce stringers 54, design principals of the composite charge 80 described below can be used to produce any of a wide variety of components used in the airframe of the airplane 40, as well as those used for applications in other industries.

Referring now to FIGS. 6-11, a composite charge 80 comprises a stack 81 of plies 82 of prepreg, each formed of unidirectional reinforcement fibers 92 held in a polymer matrix. The fibers 92 may comprise carbon, fiberglass, Kevlar or other suitable fibers, while the polymer matrix may comprise a suitable thermoset or thermoplastic, depending on the application. The fibers 92 in each of the plies 82 has a selected direction 88 relative to a reference direction 86, such as the longitudinal axis 84 (FIG. 4) of the stringer 54 to be formed using the composite charge 80. In some examples, each of the plies 82 comprises prepreg tape having a width that is equal to the width of the plies 82. The plies 82 may be laid up using automated or semi-automated tape laying equipment (not shown) such as a laminator, and in some examples, all of the plies 82 of the composite charge 80 may be laid up substantially simultaneously in a single pass or "stroke" of the laminator, thus contributing to production efficiency. The composite charge 80 can be formed by any of several techniques, including compression "punch" forming, LASH forming or stretch forming, to name only a few.

Figure 7:
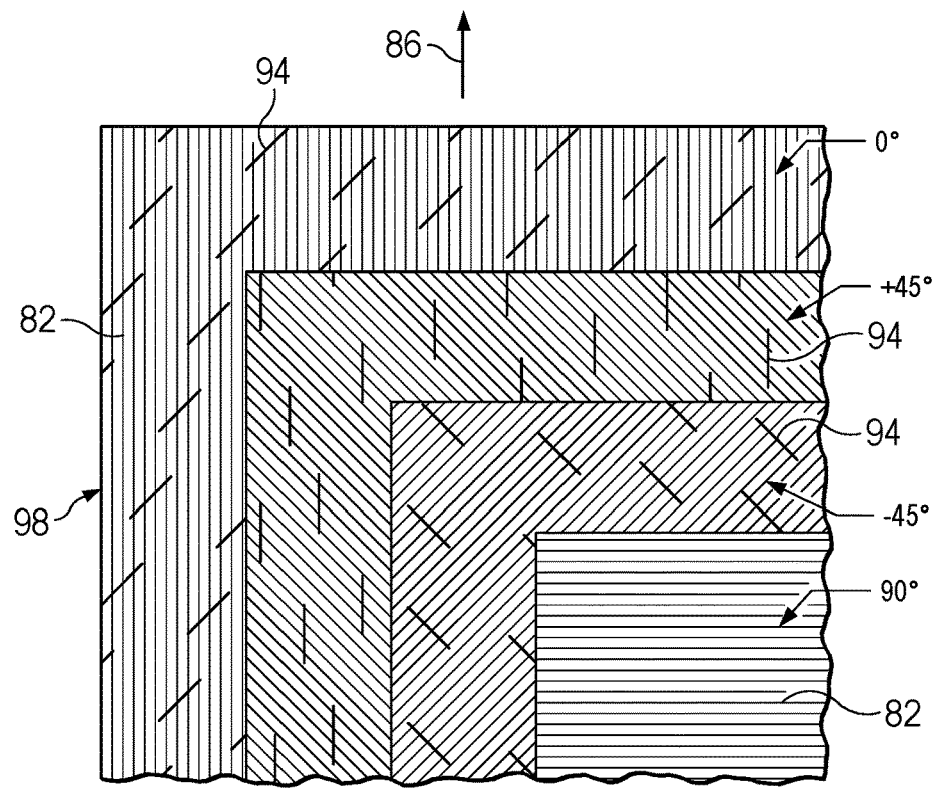
FIG. 7 is an illustration of a fragmentary plan view showing several of the plies of the composite charge of FIG. 6.
Figure 9:
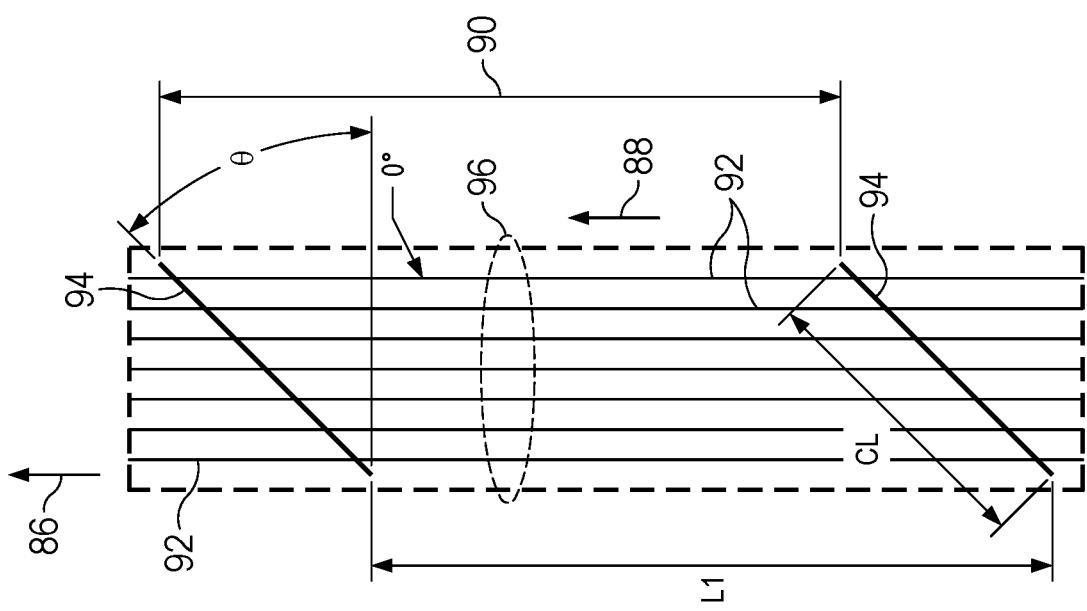
FIG. 9 is an illustration of the area designated as "FIG. 9" in FIG. 8.

The plies 82 of the composite charge 80 are laid up as a stack 81 according to a predetermined ply schedule which determines the number of plies and the fiber orientation of each of the plies 82. For example, as shown in FIG. 7, a composite charge 80 may be formed of any number of 0°, +45°, −45°, and 90° plies (only 4 plies of the composite charge are shown). Depending on the ply schedule, at least certain of the plies 82, for example plies 82a, 82b, 82c in FIG. 7, have angled cuts 94 therein. In the illustrated example, each of the 0°, +45° and −45° plies is provided with a pattern 83 of angled cuts 94 therein, which sever the fibers 92 in plies 82a, 82b, 82c and form ply segments 96 (FIG. 9). The spacing between the angled cuts 94 determines the length L1, L2 of the fibers 92 in each of the plies 82. As will discussed below and more detail, the length of the fibers 92 and the angle of the angled cuts 94 relative to the direction 88 of the fibers 92 are selected in a manner that optimizes the formability of the composite charge 80 without materially reducing the performance of the stringer 54, including its strength. In the illustrated example, the 90° plies do not contain angled cuts 94 because they can readily stretch 85 longitudinally 87 in the reference direction 86 during forming of the composite charge 80. However, in some examples, the 90° plies may contain angled cuts 94 for other reasons. It should be noted here that fiber angles (0°, ±45°, 90°) of the composite charge 80 used in this description are merely exemplary. A range of other fiber angles may be used, depending upon the application. For example, a different set of fiber angles may be required in applications where there is an emphasis on weight reduction.

Figure 8:
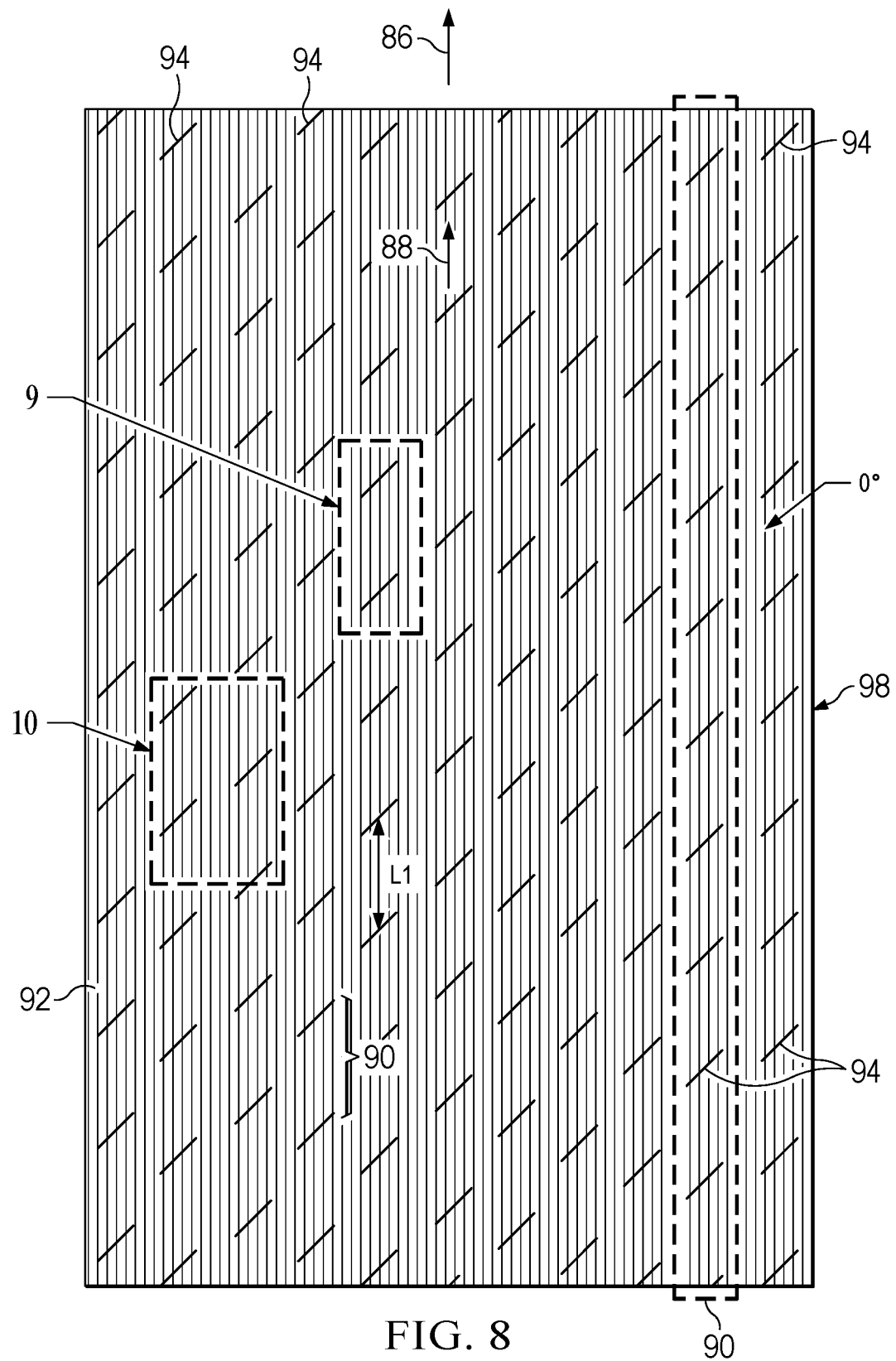
FIG. 8 is an illustration of a plan view of a 0° ply having angled cuts that are staggered from each other.
Figure 10:
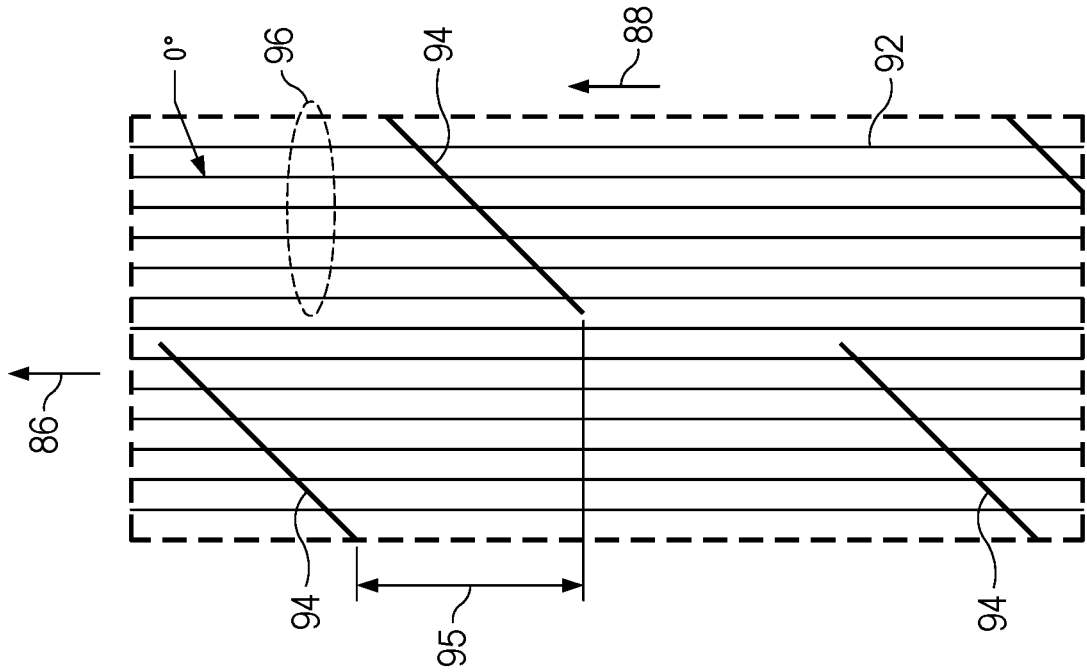
FIG. 10 is an illustration of the area designated as "FIG. 10" in FIG. 8.

Attention is now particularly directed to FIGS. 8-10, which illustrate a 0° ply having one suitable pattern 83 of angled cuts 94. The angled cuts 94 are arranged in columns 90 that are staggered relative to each other a selected distance 95 (FIG. 10). The fibers 92 are aligned with the reference direction 86, and the angled cuts 94 in each column 90 are spaced apart from each to form groups of fibers 92 that will be referred to as "ply segments" 96. Each ply segment 96 contains fibers 92 having a length L1 that is determined by the spacing between the angled cuts 94. Generally, it is desirable that the length L1 is as long as possible, providing that the desired formability can be achieved, because loads are transferred through the stringer 54 primarily along the X-axis (FIGS. 3-5), i.e. in the reference direction 86. However, in sections of the stringer 54 having tighter contours, such as along contours within the XZ, the fiber lengths L1 may need to be shorter in order to allow the ° plies to stretch 85 and conform to the contours.

As best seen in FIG. 9, each of the angled cuts 94 forms an angle θ with respect to the direction of the fibers 92. The length L1 determined by the spacing between the angled cuts 94, and the angle θ Will depend upon the application, and more particularly on the load conditions, geometry and out-of-plane features at differing locations along the length of the stringer 54. In one example for stringer applications, L1 is between approximately 10 inches and approximately 20 inches, while the angle θ is in the range of approximately 10° to approximately °. In another example for a stringer application, L1 is approximately 20 inches, and angle θ is approximately 15°. Generally, it has been found that cuts at an angle θ Of 15°, although severing the reinforcing fibers, reduces or eliminates any reductions in the strength of a stringer, sometimes referred to as strength "knockdown" in those areas were the fibers 92 are cut. Moreover, the use of angled cuts 94 at a 15° angle in combination with the pattern 83 of angled cuts 94 disclosed herein, reduces problems with removing the backing paper (not shown) on the tape, particularly along the edges 98 of the plies 82, as the plies 82 are being laid up by an automated laminator.

Figure 11:
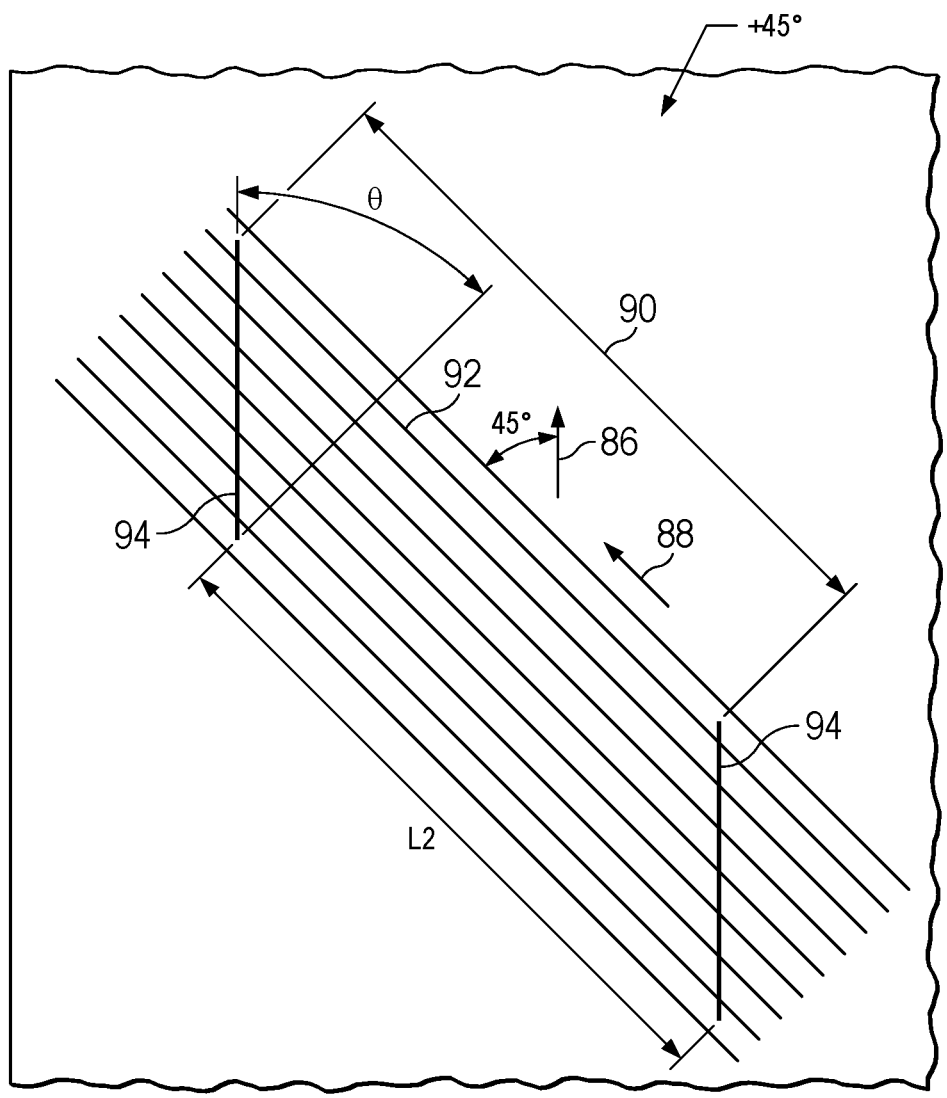
FIG. 11 is an illustration of a fragmentary plan view of a portion of a 45° ply having angled cuts.

Referring to FIG. 11, the fibers 92 in the +45° plies are oriented at a 45° angle relative to the reference direction 86, and the fibers 92 in the ply segments 96 formed by the angled cuts 94 have a length L2. The angled cuts 94 form an angle θ relative to the fiber directions 88 in the +45° plies. Both the length L and the angle θ depend on the application and more particularly on the load conditions, geometry and out-of-plane features at differing locations along the length of the stringer 54. In one example, L2 is between approximately 2 inches and approximately 4 inches, and el is in the range of approximately ° to approximately 30°. In another example, L2 is approximately 2 inches, and el is approximately 15°. The length L2 and angle θ for the −45° plies are substantially the same as those for the +45° plies. Generally, L2 may need to be at the lower end of the range mentioned above in those areas where the stringer 54 is highly contoured within the YZ plane since the 45° plies stretch 85 transversely 89 a greater amount 97. In the case of a stringer 54 having ramps, the +45° and −45° fibers need to be shorter, typically in the range of 2 to 4 inches long, because there is a need for a larger amount 97 of ply stretching but a reduced need for strength compared to the 0° plies which primarily carry the loads along the X-axis.

The fiber lengths L1, L2 and the cut angle θ are optimized for each stringer configuration to allow forming of the composite charge 80 to a desired contour at various sections along the length of the stringer 54 with minimal or no ply wrinkling. The need for providing the composite charge 80 with the ability to stretch 85 during forming is particularly important in those sections of the stringer 54, such as ramps, that have compound contours. Optimization of the fiber lengths L1 and L2 involve a selection process representing a balance between strength and formability in each ply direction (0°, +45°, −45°). It should be noted here that while some sections of the composite charge 80 have angled cuts 94 to provide the necessary formability due to stringer contours, cuts in other sections of the stringer 54, such as straight sections, may not be required because those sections can be formed to shape without wrinkling. During the forming process, the angled cuts 94 in the 0° plies permit the fibers in those plies to separate slightly and move apart longitudinally 87 in the reference direction 86, allowing the ply to stretch 85 and bend within the XZ plane (FIGS. 3, 4 and 5) without wrinkling. However, the fiber length L1 is sufficient to maintain the strength necessary to carry loads on the stringer 54 at each section along its length. In a similar manner, the angled cuts 94 in the +45° and −45° plies allow the fibers 92 in those plies to move apart slightly in the transverse direction, allowing the +45° and −45° plies to stretch 85 and bend as necessary in the YZ plane without wrinkling during the forming process.

Figure 12:
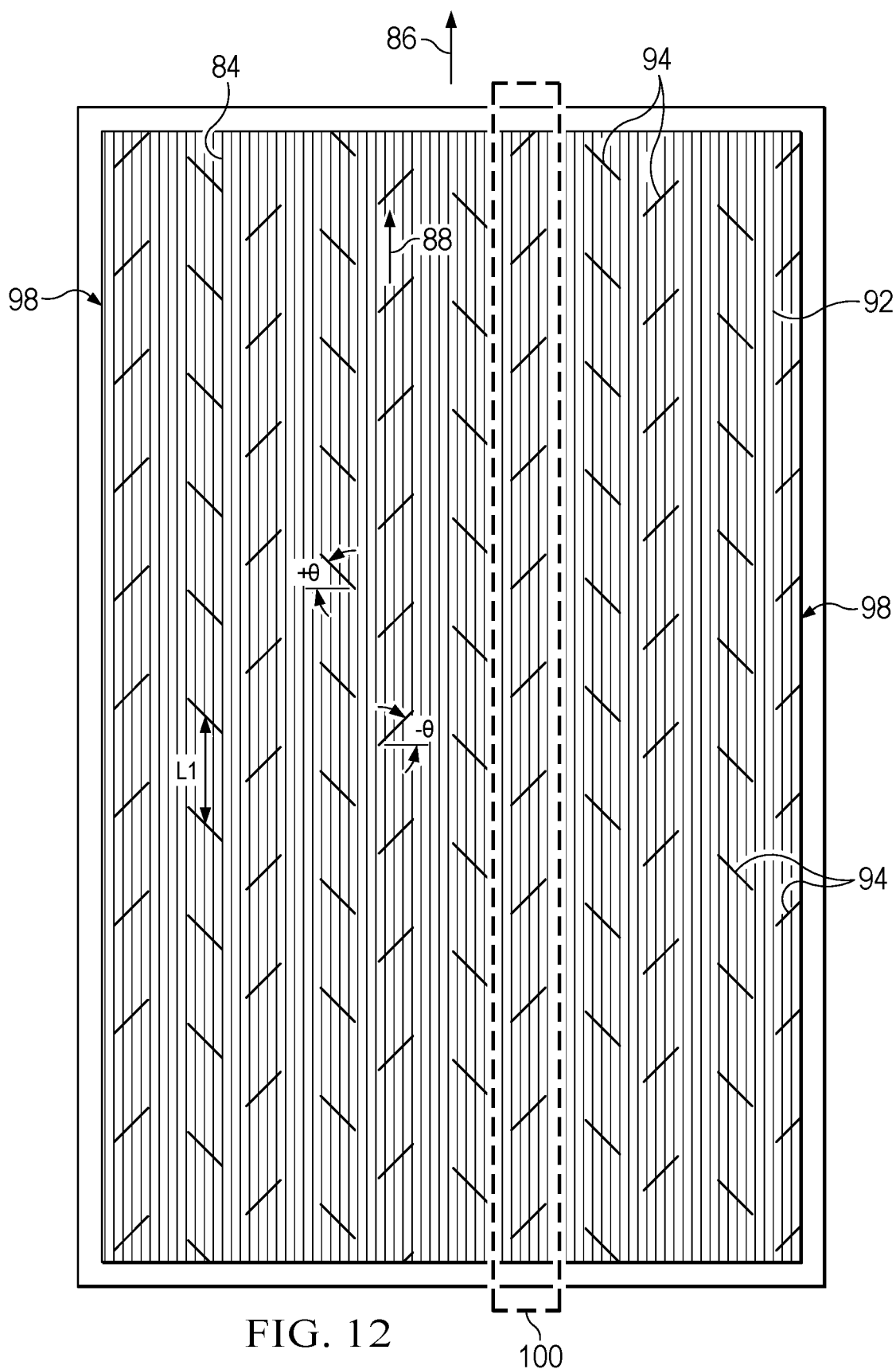
FIG. 12 is an illustration similar to FIG. 8, but wherein the angled cuts in adjacent columns are arranged at opposite angles.

The pattern 83 of angled cuts 94 in the example shown in FIG. 8 is merely illustrative of a wide range of cut patterns 83 that are possible. The pattern 83 of angled cuts 94 chosen will depend upon the application, including the loading and other requirements of various sections of the stringer 54 along its length. In some examples, the pattern 83 of the angled cuts 94 that is selected randomly disburses (FIG. 8) the angled cuts 94 over the plies 82. FIG. 12 illustrates a 0° ply having another example of a pattern 83 of angled cuts 94. In this example, the angled cuts 94 in alternate columns 100 are arranged at two opposite angles, +0, −0 relative to the fiber direction 88. In other words, the angle of the angled cuts 94 are reversed in alternate columns and are staggered relative to each other. Staggering the angled cuts 94 disperses them, thereby reducing strength knockdown. This alternating arrangement of the angled cuts 94 minimizes the reduction in load carrying capacity of the 0° plies caused by the angled cuts 94. The angles of the angled cuts 94, as well as the length L1 of the cut fibers 92 will be similar to those described earlier in connection with the example shown in FIGS. 8-11. A similar arrangement of alternating cut angles can be used in the 45° plies (not shown) where the cut angles +0, −0 as well as the cut fiber lengths L2 will be similar to those described above in connection with the example shown in FIG. 11.

As previously noted, the description above illustrates the use of a composite charge 80 suitable for forming stringers 54, however similar design principals, which will be described in greater detail below, can be used to produce any of a wide variety of composite laminate components such as those used in the airframe of the airplane 40. Each application requires optimization of a series of parameters, including but not limited to fiber angles, fiber length in each fiber direction, cutting patterns, manufacturability considerations of the chosen cutting pattern 83 and the strains encountered when forming the composite charge 80 to a desired shape. The angled cuts 94 determine the fiber lengths in each fiber direction. Shorter ply segments 96 (fiber lengths) are more easily formed, but may have reduced strength, while longer ply segments 96 may be less formable but result in higher strength. The cutting pattern 83 selected determines the fiber length as well as the distribution of the angled cuts 94. Also, appropriate consideration is given to the distribution of the cuts. For example, if all of the angled cuts 94 are located in a single, unique location in the composite charge 80, the strength of the structure will be lower than if the cuts are fully disbursed through the volume of the composite charge 80 and/or disbursed through the area of each of the plies 82. Thus, a cut pattern should be selected that disburses the angled cuts 94 over the area of each of the plies 82.

As noted above, consideration must be given to the manufacturability of the chosen cutting pattern 83. The exit angle of the cut 94 relative to the direction in which the backing paper is removed significantly affects whether the backing paper is drawn away without snagging or leaving bits of paper on the prepreg. Any bits of backing paper left on the prepreg constitute FOD (foreign objects and debris) which will require removal, which not only adds to production costs, but may result in rejection of the part because it fails inspection. Furthermore, the chosen cutting pattern 83 may also determine the type and design of the equipment used to produce the angled cuts. Some types of equipment designs may not be feasible to produce or may be prohibitively expensive for a particular application or production environment. Other equipment choices, while effective, may not be sufficiently efficient for high rate production.

As indicated earlier, designing a composite charge for a particular application requires careful consideration be given to the strains that result from forming the composite charge to particular shapes for a given application. Each application, such as skins, stringers, floor beans, floor panels and control surfaces for airplanes require different amounts of forming which produce different amounts of strains that require consideration when designing the composite charge. For example, some components such as floor panels are relatively flat, and may not require that any of the fibers in the plies of the composite charge be cut. Other components such as stringers, may be only slightly contoured but are required to possess a high degree of strength, thus giving rise to unique design considerations. In the case of wing stringers, the contours of the stringers follow those of the wing, which typically is on the order of a radius of 1000 inches. Thus, in the case of a wing stringer, it has been found that in order to maintain the necessary stringer strength while allowing forming of the composite charge to the necessary wing curvature, the fibers in the 0° plies of the composite charge should be cut to lengths and the range of approximately 10 to 20 inches. Fiber lengths that are longer than the high end of this range reduce the formability of the composite charge and increase the possibility of ply wrinkling which results in strength knockdown. However, fiber lengths that shorter than the low end of this range reduce the strength of the stringer below an acceptable level.

As described above, the fibers in the 0° plies 82 are cut to lengths between 10 and 20 inches to allow the 0° fibers 92 to stretch 85 and allow the composite charge 80 to be formed to the curvature of the wing 44 along its length. In those locations where the stringer 54 must conform to out-of-plane features such as ramps on the skin 53 where the skin 53 thickens, forming the composite charge 80 into the shape of the ramps is dominated by shearing of the 45° fibers 92, rather than their extension as in the case of the 0° fibers 92. Consequently, the fibers 92 in the ° plies 82 must stretch 85 transversely 89 considerably more than the 0° plies 82 must stretch 85 to accommodate wing curvature. In order to achieve the stretch 85 that is needed transversely 89, the 45° fibers are cut to a shorter length, within the range of 2 to 4 inches, but only in those particular areas of the stringer 54 e.g. the ramps, were a high degree of transverse stretching (shearing) is necessary during forming without ply wrinkling. Although the 45° fibers 92 are cut to a length that is much less than the 0° fibers 92, any knockdown in strength of the stringer 54 is minimal and therefore acceptable because the primary loads on the stringer 54 are carried by the ° plies 82, rather than the 45° plies 82. As discussed earlier, in areas of the stringer 54 that are not curved or have out of plane features, the fibers 92 in the plies 82 of the composite charge 80 in those areas need not be cut since those plies 82 are not required to stretch 85 as the composite charge 80 is being formed to the desired stringers shape.

Figure 13:
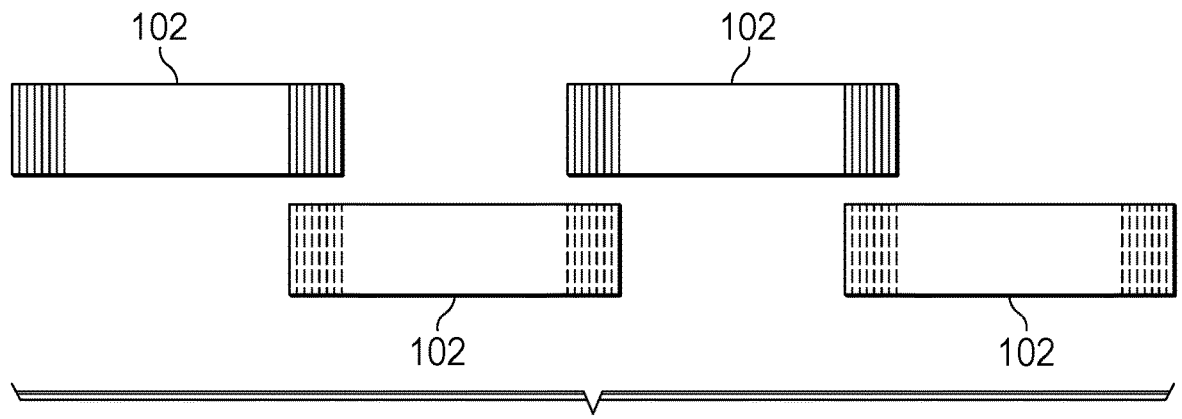
FIG. 13 is an illustration of a plan view of four individual charge segments prior to being joined together.
Figure 14:
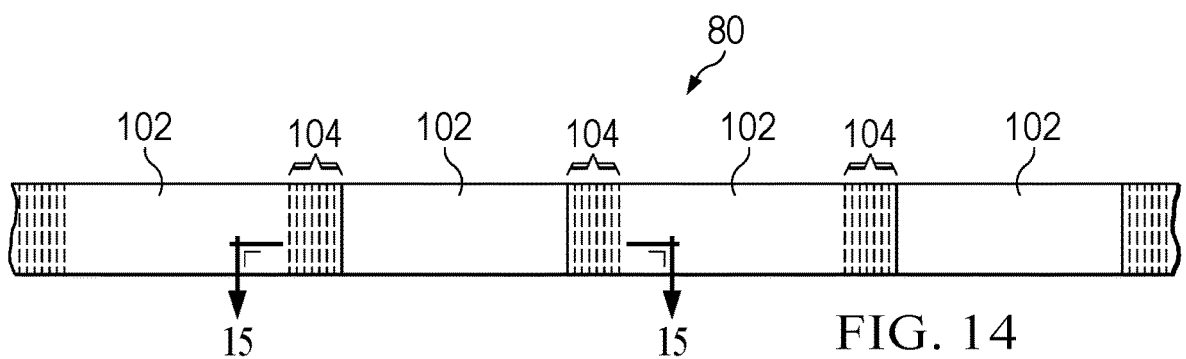
FIG. 14 is an illustration of a plan view showing the charge segments of FIG. 14 having been joined together into a complete charge.
Figure 15:
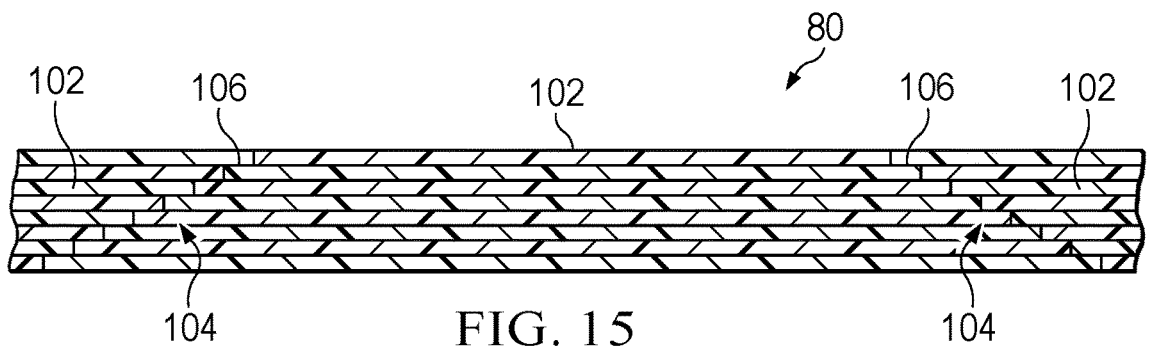
FIG. 15 is an illustration of a sectional view taken along the line 15-15 on FIG. 14.

Referring now to FIGS. 13-15, stringers 54 may be produced using a plurality of charge segments 102 that may overlap each other and are joined together to form a complete composite charge 80. Each of the charge segments 102 comprises stack 81 of individual plies 82 laid up according to a predetermined ply schedule that may include, for example, any number of 0°, +45°, −45° and 90° plies, although other ply orientations are possible. The plies 82 in each of the charge segments 102 has a pattern 83 of angled cuts 94 therein corresponding to the description of the examples previously described in connection with FIGS. 7-12. In some examples, all of the charge segments 102 may have plies arranged according to the same ply schedule. In other words, all of the charge segments 102 may be substantially identical. In one example, the composite charge 80 may comprise two or more charge segments 102 in order to produce longer stringers 54 that can be accommodated by production equipment that is limited to forming shorter composite charges 80. In other examples, however, the charge segments 102 may be different in terms of their ply schedules, fiber lengths, cut angles and/or cut patterns, in order to tailor the composite charge 80 along its length to meet local load demands and/or other conditions. For example, the charge segments 102 can be tailored and optimized to respectively meet local load demands and geometries of stringers 54 used in inboard section 74, intermediate section 76, and outboard section 78 (FIG. 2) of a 44. Shorter charge segments 102 enhance the formability of a composite charge 80 in those areas of the stringer 54 that are highly contoured. The charge segments may have the same or different lengths.

The charge segments 102 may be laid up with ply drop-offs 106 at one or one or both ends. Following layup, the charge segments 102 can be joined together as by co-curing at the joints 104. In the illustrated example, the charge segments 102 are connected by step lap joints, however any of a variety of other types of joints may be used, depending upon the application. In some examples, each of the charge segments 102 comprises prepreg tape having a width that is equal to the width of the charge segments 102, however, in other examples, each the plies 82 may comprise multiple tape widths. The plies 82 of the charge segments 102 may be laid up on top of each other either individually or all together substantially simultaneously.

Figure 16:
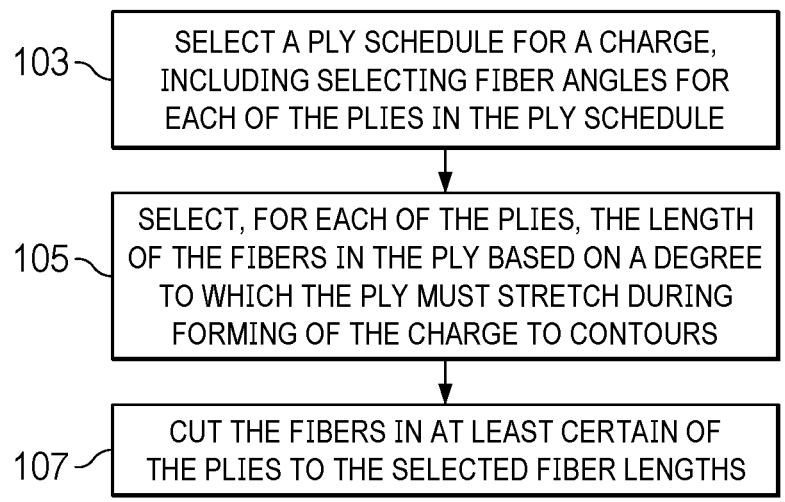
FIG. 16 is an illustration of a flow diagram of a method of making a charge used to form a contoured composite laminate structure.

Reference is now made to FIG. 16, which broadly illustrates the overall steps of a method of making a composite charge 80 that can be used to form a contoured composite laminate structure. Beginning at 103, a ply schedule is selected for the composite charge 80, which includes selecting the fiber angles for each of the plies 82 in the ply schedule. At 105, for each of the plies 82, the length of the fibers 92 in the ply 82 is selected based on the degree to which each of the plies 82 must stretch 85 during the forming of the composite charge 80 to contours. At 107, the fibers 92 are cut in certain of the plies 82a, 82b, 82c in order to achieve the fiber lengths selected in step 105. Cutting the fibers 92 may include cutting groups of the fibers 92. Selecting the length of the fibers 92 includes selecting the length of the fibers 92 that must stretch 85 longitudinally 87 and selecting the length of the fibers 92 that must stretch 85 transversely 89. Typically, the length of the fibers 92 that must stretch 85 longitudinally 87 is greater than the length of the fibers 92 that must stretch 85 transversely 89, depending upon the structure that is being formed. Also, the method includes determining the strain on different parts of the composite charge 80 during the forming process, since determining the length of fibers 92 is based on the strain that expected to be encountered during the forming of the composite charge 80.

Figure 17:
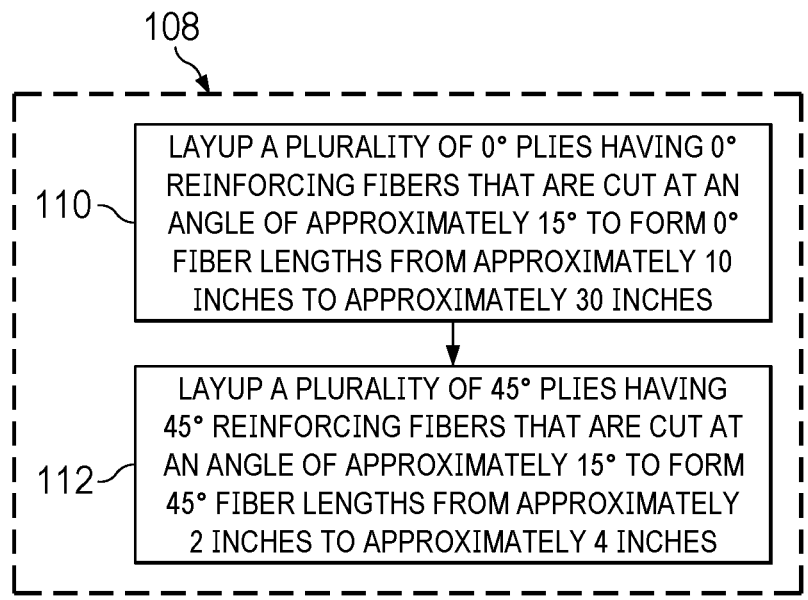
FIG. 17 is an illustration of a flow diagram of a method of producing a highly formable composite charge.

Attention is now directed to FIG. 17, which illustrates a method of making a composite charge 80 suitable for forming a stringer 54 formed of a laminate and having contours. A stack 81 of plies 82 is laid up at 108 by laying up a plurality of 0° plies having 0° reinforcing fibers that are cut at an angle of approximately 15° to form 0° fiber lengths from approximately inches to approximately 30 inches. The layup process at 108 also includes at 112, laying up a plurality of 45° plies having ° reinforcing fibers that are cut at an angle of proximately ° to form 45° fiber lengths from 2 to approximately 4 inches.

Figure 18:
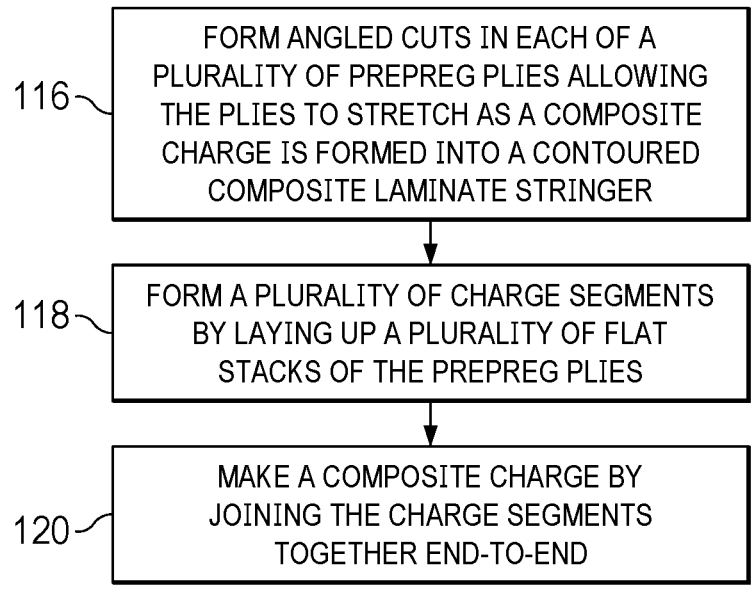
FIG. 18 is an illustration of a flow diagram of a method of producing a composite charge suitable for forming substantially wrinkle-free, contoured composite laminate stringers.

FIG. 18 illustrates another method for producing composite charges used to form contoured, composite laminate stringers. Beginning at 116, angled cuts 94 are formed in each of a plurality of plies 82 of prepreg, allowing the plies 82 to stretch 85 as the composite charge is formed into a stringer that is contoured. At 118, a plurality of charge segments 102 are formed by laying up a plurality of stacks 81 of the plies 82. At 120, a composite charge 80 is made by joining the charge segments 102 together end-to-end.

Figure 19:
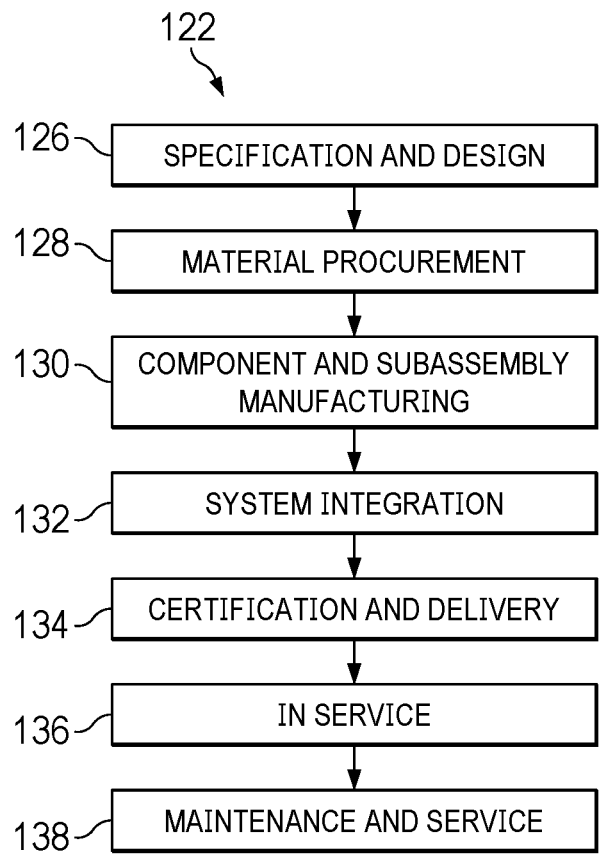
FIG. 19 is an illustration of a flow diagram of aircraft production and service methodology.
Figure 20:
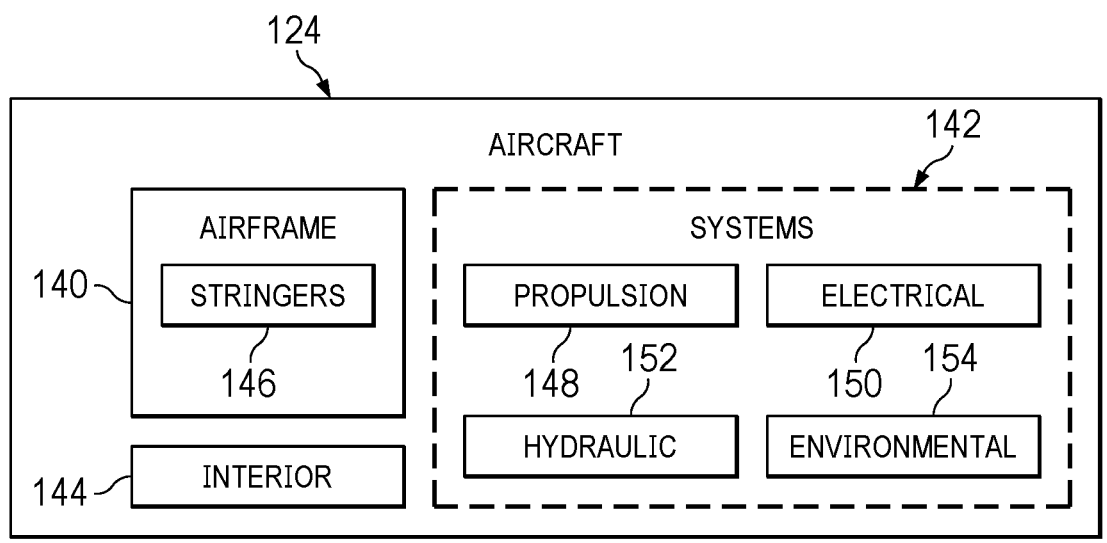
FIG. 20 is an illustration of a block diagram of an aircraft.

Examples of the disclosure may find use in a variety of potential applications, particularly in the transportation industry, including for example, aerospace, marine, automotive applications and other application where contoured composite laminate stiffeners such as stringers in aircraft, may be used. Thus, referring now to FIGS. 19 and 20, examples of the disclosure may be used in the e context of an aircraft manufacturing and service method 122 as shown in FIG. 19 and an aircraft 124 as shown in FIG. 20. Aircraft applications of the disclosed examples may include a variety of composite laminate stiffeners that have contours, curvatures, varying thicknesses or other out of plane features at locations along their lengths. However, any portion of the aircraft 124 may be assembled using the composite charge 80 and/or according to the manufacturing and service method 122. During pre-production, exemplary aircraft manufacturing and service method 122 may include specification and design 126 of the aircraft 124 and material procurement 128. During production, component and subassembly manufacturing 130 and system integration 132 of the aircraft 124 takes place. Thereafter, the aircraft 124 may go through certification and delivery 134 in order to be placed in service 136. While in service by a customer, the aircraft 124 is scheduled for routine maintenance and service 138, which may also include modification, reconfiguration, refurbishment, and so on.

Each of the processes of the aircraft manufacturing and service method 122 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 124 produced by exemplary aircraft manufacturing and service method 122 may include an airframe 140 with a plurality of high level systems 142 and an interior 144. The airframe 140 may include various types of contoured, composite laminate stiffeners such as stringers 146. Examples of high-level systems 142 include one or more of a propulsion system 148, an electrical system 150, a hydraulic system 152 and an environmental system 154. Any number of other systems may be included. Although an aircraft example is shown, the principles of the disclosure may be applied to other industries, such as the marine and automotive industries.

Systems and methods embodied herein may be employed during any one or more of the stages of the aircraft manufacturing and service method 122. For example, components or subassemblies corresponding to production process 130 may be fabricated or manufactured in a manner similar to components or subassemblies produced while the aircraft 124 is in service. Also, one or more apparatus examples, method examples, or a combination thereof may be utilized during subassembly manufacturing 130 and system integration 132, for example, by substantially expediting assembly of or reducing the cost of an aircraft 124. Similarly, one or more of apparatus examples, method examples, or a combination thereof may be utilized while the aircraft 208 is in service, for example and without limitation, to maintenance and service 138.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of making a composite charge used to form a contoured composite laminate structure, comprising:
    selecting a schedule of plies for the composite charge, each of the plies having fibers, including selecting angles for the fibers in each of the plies in the schedule of plies;
    selecting, for each of the plies in the schedule of plies, a length of the fibers in the plies based on an amount to which the plies must stretch during forming of the composite charge to contours;
    making cuts in the fibers in at least certain of the plies to the length; and
    staggering the cuts in the fibers, wherein staggering the cuts randomly disburses the cuts over the plies,
    wherein selecting a length of the fibers includes:
        selecting the length of the fibers that must stretch longitudinally, and
        selecting the length of the fibers that must stretch transversely,
        wherein the length of the fibers that must stretch longitudinally is greater than the length of the fibers that must stretch transversely.

2. The method of claim 1, further comprising:
    determining strain on different parts of the composite charge during the forming of the composite charge,
    wherein determining the length of the fibers is based on the strain, and
    wherein cutting the fibers includes
        cutting a plurality of 0° plies each having 0° reinforcing fibers that are cut at an angle of approximately 15° to form 0° fiber lengths,
        cutting a plurality of 45° plies each having 45° reinforcing fibers that are cut at an angle of approximately 15° to form 45° fiber lengths, and
        wherein the length of the fibers that must stretch longitudinally is greater than the length of the fibers that must stretch transversely.

3. The method of claim 1, further comprising:
    determining strain on different parts of the composite charge during the forming of the composite charge,
    wherein determining the length of the fibers is based on the strain, and
    wherein cutting the fibers includes
        cutting a plurality of 0° plies each having 0° reinforcing fibers that are cut at an angle of approximately 15° to form 0° fiber lengths and
        cutting a plurality of 45° plies each having 45° reinforcing fibers that are cut at an angle of approximately 15° to form 45° fiber lengths.

4. The method of claim 1, wherein cutting the fibers includes
    cutting a plurality of 0° plies each having 0° reinforcing fibers that are cut at an angle of approximately 15° to form 0° fiber lengths and
    cutting a plurality of 45° plies each having 45° reinforcing fibers that are cut at an angle of approximately 15° to form 45° fiber lengths.

5. The method of claim 1, wherein cutting the fibers includes cutting groups of the fibers in the plies.

6. The method of claim 1, further comprising:
    determining strain on different parts of the composite charge during the forming of the composite charge, and
    wherein determining the length of the fibers is based on the strain.

7. A composite structure for an aircraft made by the method of claim 1.

8. A method, comprising:
    selecting a schedule of plies for a composite charge, each of the plies having fibers, including selecting angles for the fibers in each of the plies in the schedule of plies;
    selecting, for each of the plies in the schedule of plies, a length of the fibers in the plies based on an amount to which the plies must stretch during forming of the composite charge to contours;
    making cuts in the fibers in at least certain of the plies to the length; and
    staggering the cuts in the fibers, wherein staggering the cuts randomly disburses the cuts over the plies,
    wherein cutting the fibers includes
        cutting a plurality of 0° plies each having 0° reinforcing fibers that are cut at an angle of approximately 15° to form 0° fiber lengths and
        cutting a plurality of 45° plies each having 45° reinforcing fibers that are cut at an angle of approximately 15° to form 45° fiber lengths.

9. The method of claim 8, further comprising:
    determining strain on different parts of the composite charge during the forming of the composite charge,
    wherein determining the length of the fibers is based on the strain, and
    wherein selecting a length of the fibers includes:
        selecting the length of the fibers that must stretch longitudinally, and
        selecting the length of the fibers that must stretch transversely.

10. The method of claim 8, further comprising:
    determining strain on different parts of the composite charge during the forming of the composite charge,
    wherein determining the length of the fibers is based on the strain, and wherein selecting a length of the fibers includes:
   selecting the length of the fibers that must stretch longitudinally, and
   selecting the length of the fibers that must stretch transversely,
   wherein the length of the fibers that must stretch longitudinally is greater than the length of the fibers that must stretch transversely.

11. The method of claim 8, wherein cutting the fibers includes cutting groups of the fibers in the plies.

12. The method of claim 8,
wherein selecting a length of the fibers includes:
   selecting the length of the fibers that must stretch longitudinally, and
   selecting the length of the fibers that must stretch transversely,
   wherein the length of the fibers that must stretch longitudinally is greater than the length of the fibers that must stretch transversely.

13. The method of claim 8, further comprising:
   determining strain on different parts of the composite charge during the forming of the composite charge, and
   wherein determining the length of the fibers is based on the strain.

14. A composite structure for an aircraft made by the method of claim 8.

15. A method, comprising:
   selecting a schedule of plies for a composite charge, each of the plies having fibers, including selecting angles for the fibers in each of the plies in the schedule of plies;
   selecting, for each of the plies in the schedule of plies, a length of the fibers in the plies based on an amount to which the plies must stretch during forming of the composite charge to contours;
   making cuts in the fibers in at least certain of the plies to the length;
   determining strain on different parts of the composite charge during the forming of the composite charge; and
   staggering the cuts in the fibers, wherein staggering the cuts randomly disburses the cuts over the plies,
   wherein determining the length of the fibers is based on the strain.

16. The method of claim 15,
wherein cutting the fibers includes
   cutting a plurality of 0° plies each having 0° reinforcing fibers that are cut at an angle of approximately 15° to form 0° fiber lengths and
   cutting a plurality of 45° plies each having 45° reinforcing fibers that are cut at an angle of approximately 15° to form 45° fiber lengths, and
wherein selecting a length of the fibers includes:
   selecting the length of the fibers that must stretch longitudinally, and
   selecting the length of the fibers that must stretch transversely,
wherein the length of the fibers that must stretch longitudinally is greater than the length of the fibers that must stretch transversely.

17. A composite structure for an aircraft made by the method of claim 15.

18. The method of claim 15, wherein cutting the fibers includes
   cutting a plurality of 0° plies each having 0° reinforcing fibers that are cut at an angle of approximately 15° to form 0° fiber lengths and
   cutting a plurality of 45° plies each having 45° reinforcing fibers that are cut at an angle of approximately 15° to form 45° fiber lengths.

19. The method of claim 15, wherein cutting the fibers includes cutting groups of the fibers in the plies.

20. The method of claim 15,
wherein selecting a length of the fibers includes:
   selecting the length of the fibers that must stretch longitudinally, and
   selecting the length of the fibers that must stretch transversely,
wherein the length of the fibers that must stretch longitudinally is greater than the length of the fibers that must stretch transversely.

\* \* \* \* \*